UNITED STATES PATENT OFFICE.

WILLIAM GODSON LINDSAY, OF NEW YORK, N. Y., ASSIGNOR TO THE CELLULOID COMPANY, A CORPORATION OF NEW JERSEY.

ACETYL-CELLULOSE COMPOUND AND METHOD OF MAKING SAME.

1,045,990. Specification of Letters Patent. Patented Dec. 3, 1912.

No Drawing. Application filed May 5, 1909. Serial No. 494,179.

*To all whom it may concern:*

Be it known that I, WILLIAM GODSON LINDSAY, a citizen of the United States, residing at New York, in the county of New York and State of New York, have invented certain new and useful Improvements in Acetyl-Cellulose Compounds and Methods of Making Same, of which the following is a full, clear, and exact specification.

This invention relates to a new composition of matter as a substitute for nitrocellulose compositions such as celluloid and similar substances. My new composition of matter possesses permanently a high degree of strength and tenacity.

My invention relates also to the process of making a substitute for nitro-cellulose compositions.

More particularly, this invention relates to treating an acetyl cellulose with a substance which arrests any tendency to decomposition and effectually prevents deterioration, the product being strong and tenacious and retaining these characteristics notwithstanding its age or amount of handling.

Previous to my invention, it has been suggested to employ certain cellulose combinations as a substitute for nitro-cellulose, but many difficulties have been met with in attempting to adapt cellulose combinations to such purposes. These proposed substitutes have been found to be defective, principally in strength and tenacity, and in many cases exhibiting brittleness due to innate or induced decomposition. The product formed by my invention is free from brittleness and retains its strength and tenacity for an indefinite time.

I have discovered that urea when added to an acetyl cellulose mixture or solution gives permanent strength and tenacity to the resultant product. The proportion of urea may be from one to two parts to each one hundred parts of acetyl cellulose in the acetyl cellulose combination or solution employed. It will be understood that these proportions can be modified to a certain extent, depending upon the quality of the acetyl cellulose.

As an example of the acetyl cellulose combination or solution above referred to, I mention an acetyl cellulose mixture in solution or in a menstruum and containing triphenylphosphate, or equivalent substance. The product thus formed is non-inflammable, transparent, and possesses a degree of strength and tenacity which is made permanent by the addition of urea as herein described. I have found that the urea remains a part of the final dried composition and effectually prevents high temperature or age from making such compound weak or brittle. The product made in accordance with my invention is particularly useful in making strong films, although, it will be understood, my product is of high utility when used in a mass.

Having thus described my invention, I declare that what I claim as new and desire to secure by Letters Patent, is:—

1. A composition of matter containing an acetyl cellulose compound in combination with urea, the latter being in suitable proportions to secure strength and tenacity of a permanent character.

2. The process of making a composition of matter consisting in combining acetyl cellulose and urea by the use of a solvent or menstruum.

3. The process of forming a composition of matter which consists in dissolving acetyl cellulose in a solvent and adding urea thereto.

4. The process of forming a composition of matter which consists in combining 100 parts acetyl cellulose with 1 to 2 parts of urea by the use of a solvent or menstruum.

5. A composition of matter containing an acetyl cellulose compound, urea and a solvent.

6. A composition of matter containing an acetyl cellulose compound, urea, triphenylphosphate and a solvent.

In testimony whereof I affix my signature, in presence of two witnesses.

WILLIAM GODSON LINDSAY.

Witnesses:
HENRY J. LUCKE,
GEO. N. KERR.

Correction in Letters Patent No. 1,045,990.

It is hereby certified that in Letters Patent No. 1,045,990, granted December 3, 1912, upon the application of William Godson Lindsay, of New York, N. Y., for an improvement in "Acetyl-Cellulose Compounds and Methods of Making Same," an error appears in the printed specification requiring correction as follows: Page 1, line 74, for the word "secure" read *insure;* and that the said Letters Patent should be read with this correction therein that the same may conform to the record of the case in the Patent Office.

Signed and sealed this 24th day of December, A. D., 1912.

[SEAL.]

C. C. BILLINGS,

*Acting Commissioner of Patents.*